(12) United States Patent
Macor et al.

(10) Patent No.: US 6,237,551 B1
(45) Date of Patent: May 29, 2001

(54) MULTI-CYLINDER DIESEL ENGINE WITH VARIABLE VALVE ACTUATION

(75) Inventors: Lorentino Macor; Andrea Pecori, both of Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 0 days.

(21) Appl. No.: 09/355,524

(22) PCT Filed: Jan. 27, 1998

(86) PCT No.: PCT/EP98/00437

§ 371 Date: Oct. 8, 1999

§ 102(e) Date: Oct. 8, 1999

(87) PCT Pub. No.: WO98/34014

PCT Pub. Date: Aug. 6, 1998

(30) Foreign Application Priority Data

Feb. 4, 1997 (IT) ............................................. TO97A0078

(51) Int. Cl.[7] ...................................................... F01L 1/34
(52) U.S. Cl. .................................... 123/90.15; 123/90.12; 123/90.16
(58) Field of Search ............................. 123/90.12, 90.15, 123/90.16, 90.46, 90.55, 90.56, 90.63, 322

(56) References Cited

U.S. PATENT DOCUMENTS

| | | | |
|---|---|---|---|
| 4,793,307 | * 12/1988 | Quenneville et al. ............ | 123/90.16 |
| 5,002,022 | * 3/1991 | Perr .................................. | 123/90.12 |
| 5,255,639 | * 10/1993 | Shirey et al. ..................... | 123/90.16 |
| 5,499,606 | * 3/1996 | Robnett et al. ................... | 123/90.12 |
| 5,503,120 | * 4/1996 | Shirey et al. ..................... | 123/90.12 |
| 5,537,976 | 7/1996 | Hu . | |
| 5,680,841 | * 10/1997 | Hu ..................................... | 123/322 |
| 5,690,065 | * 11/1997 | Janse Van Vuuren ............ | 123/90.16 |
| 5,826,551 | * 10/1998 | Janse van Vuuren ............ | 123/90.12 |
| 5,839,400 | * 11/1998 | Vattaneo et al. .................. | 123/90.16 |
| 5,839,453 | * 11/1998 | Hu ..................................... | 123/322 |
| 6,053,136 | * 4/2000 | Albanello et al. ................ | 123/90.16 |
| 6,125,828 | * 10/2000 | Hu ..................................... | 123/90.12 |

FOREIGN PATENT DOCUMENTS 2 448 032   8/1980   (FR) .

* cited by examiner

*Primary Examiner*—Teresa Walberg
*Assistant Examiner*—Fadi H. Dahbour
(74) *Attorney, Agent, or Firm*—Sughrue, Mion, Zinn, Macpeak & Seas, PLLC

(57) ABSTRACT

A multi-cylinder Diesel engine, for trucks, particularly of the type supercharged by a turbo-supercharger actuated by the exhaust gases, is provided with a variable valve actuation system for actuating the intake and exhaust valves, which, in combination with a specific geometry of the cams driving the valves, provides the possibility of a plurality of different modes of operation of the engine which can be selected according to the conditions of operation of the engine and including, in addition to the regular mode of operation, at least one mode of operation of the engine as a brake.

5 Claims, 14 Drawing Sheets

Fig_1

Fig_3

Fig_4

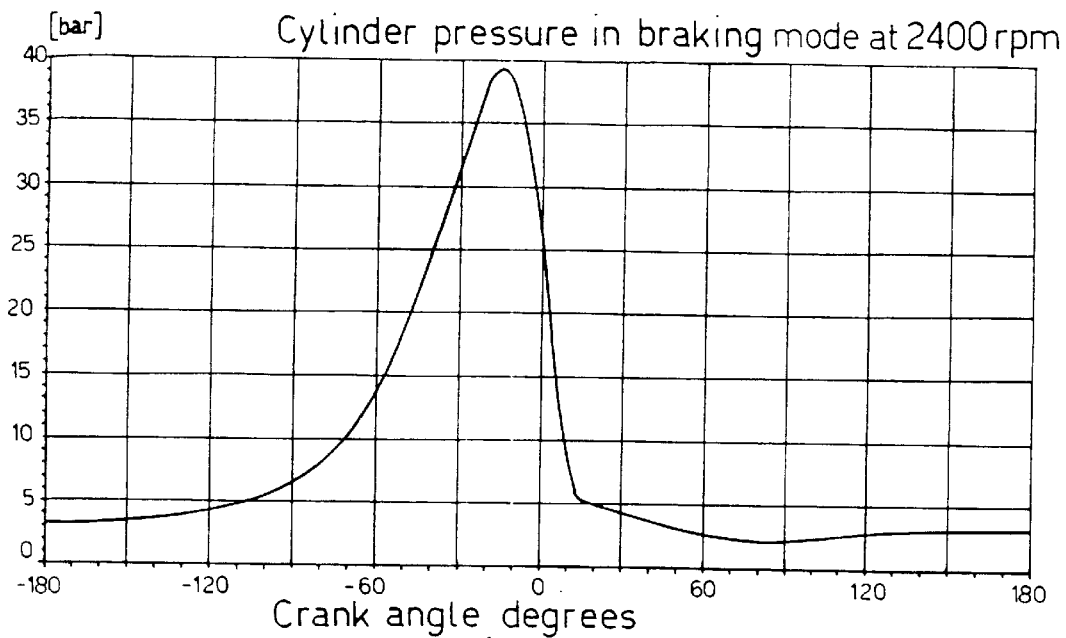
Fig_10
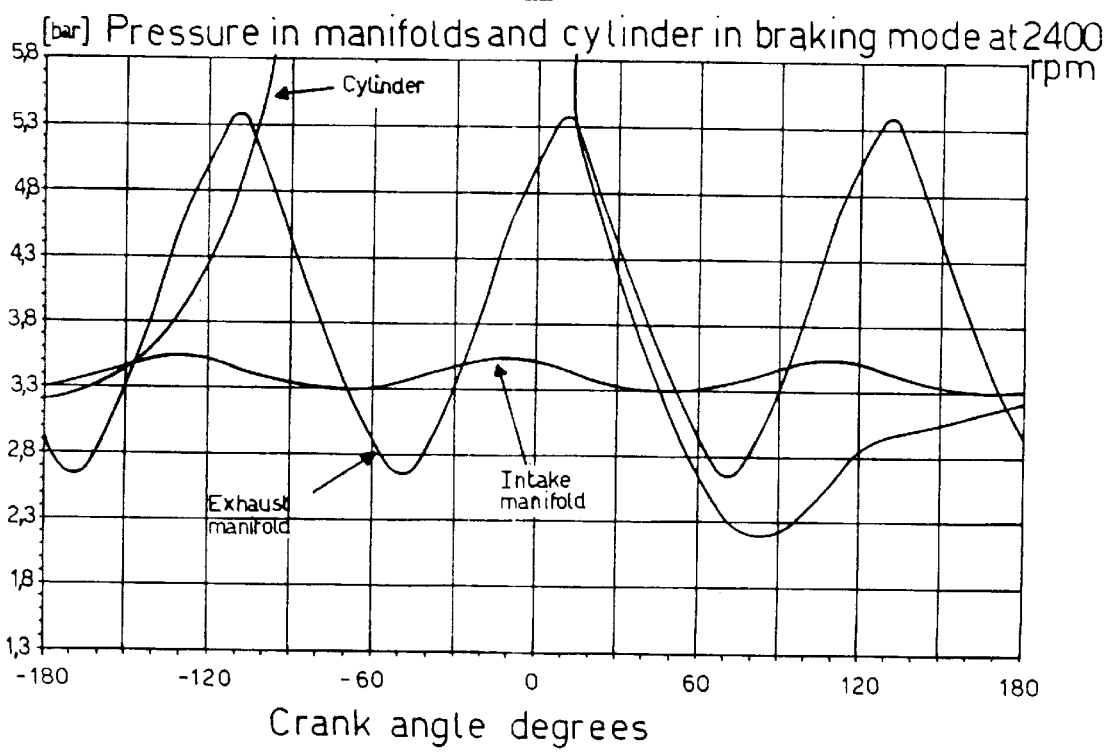
Fig_11

Fig. 14 Valve displacement in Curtill cycle

MULTI-CYLINDER DIESEL ENGINE WITH VARIABLE VALVE ACTUATION

BACKGROUND OF THE INVENTION

The present invention relates to multi-cylinder Diesel engines for motor-vehicles, in particular for trucks. The invention relates particularly, even if not exclusively, to engines of this type which are supercharged by means of a turbo-supercharger actuated by the exhaust gases.

In previous Italian patent application No. TO96A000327, which was still secret at the priority date of the present application, the Applicant has proposed a gasoline engine comprising:

at least one intake valve and at least one exhaust valve for each cylinder, each provided with respective spring means biasing the valve to a closed position, for controlling respective intake and exhaust conduits, a cam shaft, for actuating the intake and exhaust valves of the engine cylinders by means of respective tappets, each intake valve and each exhaust valve being driven by a cam of said cam shaft, each of said tappets being adapted to cause the respective intake or exhaust valve to open, against the action of said return spring means, by means of the interposition of hydraulic means including a chamber of fluid under pressure, the chamber of fluid under pressure associated with each intake or exhaust valve being adapted to be connected, by means of a solenoid valve, to an outlet channel, in order to uncouple the valve from the respective tappet and cause the valve to close rapidly under the action of the respective return spring means, electronic control means for controlling each solenoid valve, in order to vary the opening time and stroke of the respective intake or exhaust valve, as a function of one or more parameters of operation of the engine.

The above described system provides a variable control on the opening of the intake and exhaust valves, without modifying the mechanical elements which control the valve movement. Indeed, whereas in a conventional timing system the movement of each intake or exhaust valve is univocally determined by the geometry of the mechanical elements which control the valve (cam, rocker arm, tappet), in the above described system the solenoid valve controlling the chamber under pressure associated with a given valve can be caused to open at any time which is desired so as to empty said chamber from the oil under pressure and cause the intake or exhaust valve to close rapidly, under the action of the respective return spring means, even during a stage in which the respective cam would tend to keep said valve opened.

SUMMARY OF THE INVENTION

The object of the present invention is that of applying the above-mentioned variable valve actuation system to a Diesel engine, so as to obtain the possibility to provide different selectable modes of operation of the engine.

In view of achieving this object, the invention provides a multi-cylinder Diesel engine, comprising all the above indicated features and further characterized in that:

each cam of the cam shaft has a profile such as to tend to cause the respective intake or exhaust valve controlled thereby to open not only during a conventional opening stage within a regular cycle of operation of the engine, but also at some additional stages of the cycle, and in that said electronic control means are adapted to cause each solenoid valve to open, so as to keep the respective intake or exhaust valve closed, during said conventional stage and/or during one or more of said additional stages during which the respective cam would tend to cause the valve to open, so that the engine can be selectively operated according to different modes of operation by controlling said solenoid valves.

According to a first important preferred feature of the invention, said electronic control means are adapted to provide a mode of operation of the engine as a brake, wherein no fuel is injected into the cylinders, and wherein each solenoid valve is controlled so as to keep the intake and exhaust valves of each cylinder closed substantially during each stage when the respective piston raises from the bottom dead centre (BDC) to the top dead centre (TDC), so as to exploit the power absorbed at each piston upstroke to obtain a braking effect, said electronic means being also adapted to allow each exhaust valve, by closing the respective solenoid valve, immediately before the piston reaches the TDC, under the action of the respective cam.

As it is clearly apparent, the above-mentioned mode of operation of the engine as a brake represents a first example of application of the above described principle, according to which the cams of the cam shaft have a profile such as to cause the respective valves to open not only during the conventional opening stage within a regular cycle of operation of the engine, but also at some additional stages, whereas the respective solenoid valve is opened at determined stages in order to cause the valve to remain closed at these stages, or to cause the valve to be driven differently, even if the cam would tend per se to cause the valve to open. In the above-mentioned case, the cams have profile portions adapted to drive the valves in the mode of operation as a brake, which profile portions are "enabled" by the solenoid valves only when the operation as a brake is desired. As it will be shown more in detail in the following with reference to the annexed drawings, in the case instead of a regular operation of the engine, the solenoid valves are controlled by the above-mentioned electronic control means so as to "enable" the cam profile portions which control the regular opening cycle of the valves and "to disable" the profile portions which are exploited during the mode of operation as a brake.

Reverting in particular to the mode of operation as a brake, it is to be noted that in this mode each upstroke of the piston from the BDC to the TDC is exploited in order to obtain the braking effect, so that the piston has an active stroke each time it raises, according to a two-stroke cycle of operation. The power absorbed in this manner is very high and amongst to 100–120% of the rated output with regular combustion operation. For instance, if at a speed of 2400 rpm the engine output in combustion operation is 257 Kw, the power absorbed as a brake at the same speed would be 305 Kw. Since the exhaust valve is opened at the end of each piston upstroke, during the downstroke the compressed air is not able to return the whole power previously absorbed during the piston upstroke, which would happen instead if the air volume trapped within the cylinder would be always the same, thus behaving as a king of spring.

According to a further preferred feature of the invention, which relates to the case of a Diesel engine supercharged by a turbo-supercharger actuated by the exhaust gases, in the above-mentioned mode of operation of the engine as a brake, the exhaust valve is held opened also during a first part of the piston downstroke from the TDC, so as to draw air from the exhaust conduit into the cylinder, in order to decrease the air flow fed to the turbo-supercharger. This is done because, since in the mode of operation as a brake the engine operates according to a two-stroke cycle, the air flow which is fed to the turbo-supercharger in this mode would tend to be double than that normally fed to the turbo-supercharger during regular combustion operation of the engine. This would cause an excessive lowering of the turbo-supercharger efficiency and a resulting very poor compression of the air fed to the cylinder. By leaving the exhaust valve opened during the first part of the piston downstroke, a portion of the air previously fed to the exhaust conduit is taken into the cylinder, which decreases the flow through the turbine of the turbo-supercharger thus keeping the turbo-supercharger efficiency at acceptable levels.

Finally, yet in the said mode of operation of the engine as a brake, during the final part of the piston downstroke the intake valve is held opened, so as to allow the cylinder to be filled fully in view of the following upstroke, in which the intake and exhaust valves are substantially closed, so as to commence a new stage of compression of the air and power absorption.

As already indicated above, the cams of the cam shaft of the engine according to the invention have further profile portions which are for obtaining particular cycles of operation of the valves, which profile portions are "enabled" or "disabled" by the electronic control means through the respective solenoid valves, in order selectively to provide different modes of operation of the engine, in addition to the regular mode of operation and the mode of operation as a brake which has been described above.

For instance, according to a further feature of the invention, the profile of the cam controlling each exhaust valve has a portion adapted to cause an additional opening stage of the exhaust valve substantially during a final part of the intake stage. The electronic control means are adapted to "enable" this profile portion when operation of the engine according the so-called "Curtill" cycle is wished. In this particular cycle of operation of the engine, the opening of the exhaust valve substantially during a final part of the intake stage causes some fresh air at first flows directly from the intake conduit to the exhaust conduit, due to the vacuum in the exhaust manifold, whereas later on, following the increase in pressure in the exhaust manifold, some air returns from the exhaust conduit into the cylinder exploiting the extra-pressure within the exhaust manifold, so as to improve filling of the cylinder. The above described cycle, which is known per se, may be advantageously applied to the engine according to the invention since the above-mentioned electronic control means can "disable", by means of the respective solenoid valves, the profile portions of the cams which would tend to cause the above described additional opening of the exhaust valves, so as to eliminate this mode at engine speeds where it might become detrimental.

According to a further preferred feature, the engine according to the invention is able to operate yet according to a further mode of operation, corresponding to the so-called "Miller" cycle. In this mode, the electronic control means are adapted to vary (i.e. anticipate or postpone) the closing timing of the intake valve in the regular combustion cycle of operation. As known, in the Miller cycle, by anticipating or postponing the intake valve closing timing a variation is obtained of the compression ratio by which, for example in the case of an increase of the compression ratio, an increase of the temperature is obtained solving the problem of starting the engine at cold temperature. According to the invention, the cams associated with the intake valves have a profile adapted to hold the intake valve opened throughout the whole desired portion of the cycle, and the electronic control means control the respective solenoid valves in order to enable opening of the intake valves according to the desired mode. Yet with reference to the "Miller" cycle, it can be used to obtain a reversed effect, i.e. a decrease of temperature in order to decrease the amount of $NO_x$ in the exhaust gases.

In a further mode of operation of the engine according to the invention, which is exploited to overcome the problems originated by the inertia of the turbo-supercharger during transient periods, an anticipated opening of the exhaust valve is caused during the regular cycle of operation of the engine. In this mode, the exhaust gases reach the turbine of the turbo-supercharger unit with a higher enthalpy so that the turbo-supercharger can re-act more promptly to the demand from the user during transient conditions.

As it is clearly apparent, the basic principle of the invention is that of providing cams which have a complex profile, such as to tend to drive opening of the intake and exhaust valves at different stages of the engine cycle, while the variable valve actuation system is used to enable or disable the various portions of the cam profile so as to achieve different possible modes of operation of the engine, which can be selected for instance by the user or also can be electronically controlled by said electronic control means according to condition of operation of the engine.

BRIEF DESCRIPTION OF THE DRAWINGS

Further features and advantages of the invention will become apparent from the description which follows with reference to the annexed drawings, given purely by way of non limiting example, in which:

FIGS. 10, 11, 12 and 13 are diagrams showing the operation of the engine in the above-mentioned braking mode, FIG. 13 shows again the opening strokes of the valves in the mode of operation as a brake, at different engine speeds.

DETAILED DESCRIPTION OF THE INVENTION

Figure 1:
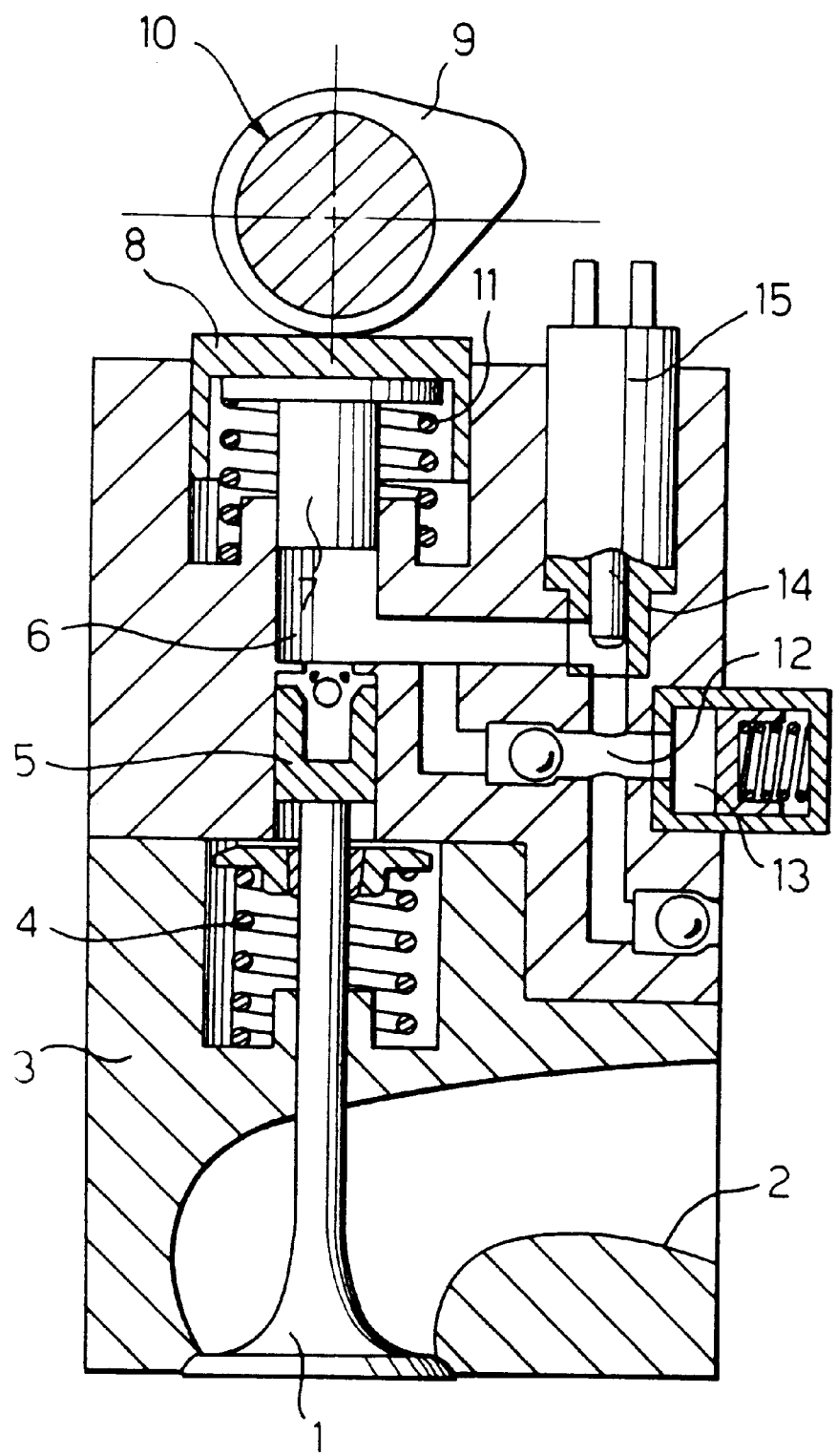
FIG. 1 is a diagrammatic view showing the principle of operation of a variable valve actuation system in an internal combustion engine.

FIG. 1 diagrammatically shows the principle of operation of a valve variable actuation system in an internal combustion engine. Numeral 1 generally designates the valve (which can be either an intake valve or an exhaust valve) associated with a respective (intake or exhaust) conduit 2, formed in a head 3 of an internal combustion engine. The valve 1 is biassed towards its closed position (upwardly, with reference to FIG. 1) by a spring 4, whereas it is caused to open by a piston 5 acting on the upper end of the valve stem. The piston 5 on its turn is controlled through the oil under pressure which is present within a chamber 6, by a piston 7 supporting a bucket 8 which cooperates with a cam 9 of a cam shaft 10. The bucket 8 is held by a spring 11 in sliding contact with cam 9. The pressure chamber 6 can be connected to conduit 12, which on its turn communicates with a pressure accumulator 13, through the shutter 14 of a solenoid valve 15 which is controlled by electronic control means (not shown) according to the conditions of operation of the engine. When the solenoid valve 15 is opened, the oil under pressure which is present in chamber 6 is discharged, so that valve 1 rapidly closes under the action of its return spring 14.

When the solenoid valve 15 is closed, the oil present in chamber 6 transmits the movements of piston 7 to piston 5 and hence to valve 1, so that the position of valve 1 is determined by cam 9. In other words, the cam 9 normally controls the opening of valve 1 according to a cycle which depends from the cam profile, but it can be "disabled" each time that this is wished by opening the solenoid valve 15, so as to interrupt the connection between piston 7 and valve 1.

The present invention relates to the application of a variable valve actuation system of the above described type to a multi-cylinder Diesel engine for trucks, which is supercharged by a turbo-supercharger actuated by the exhaust gases.

Figure 2:
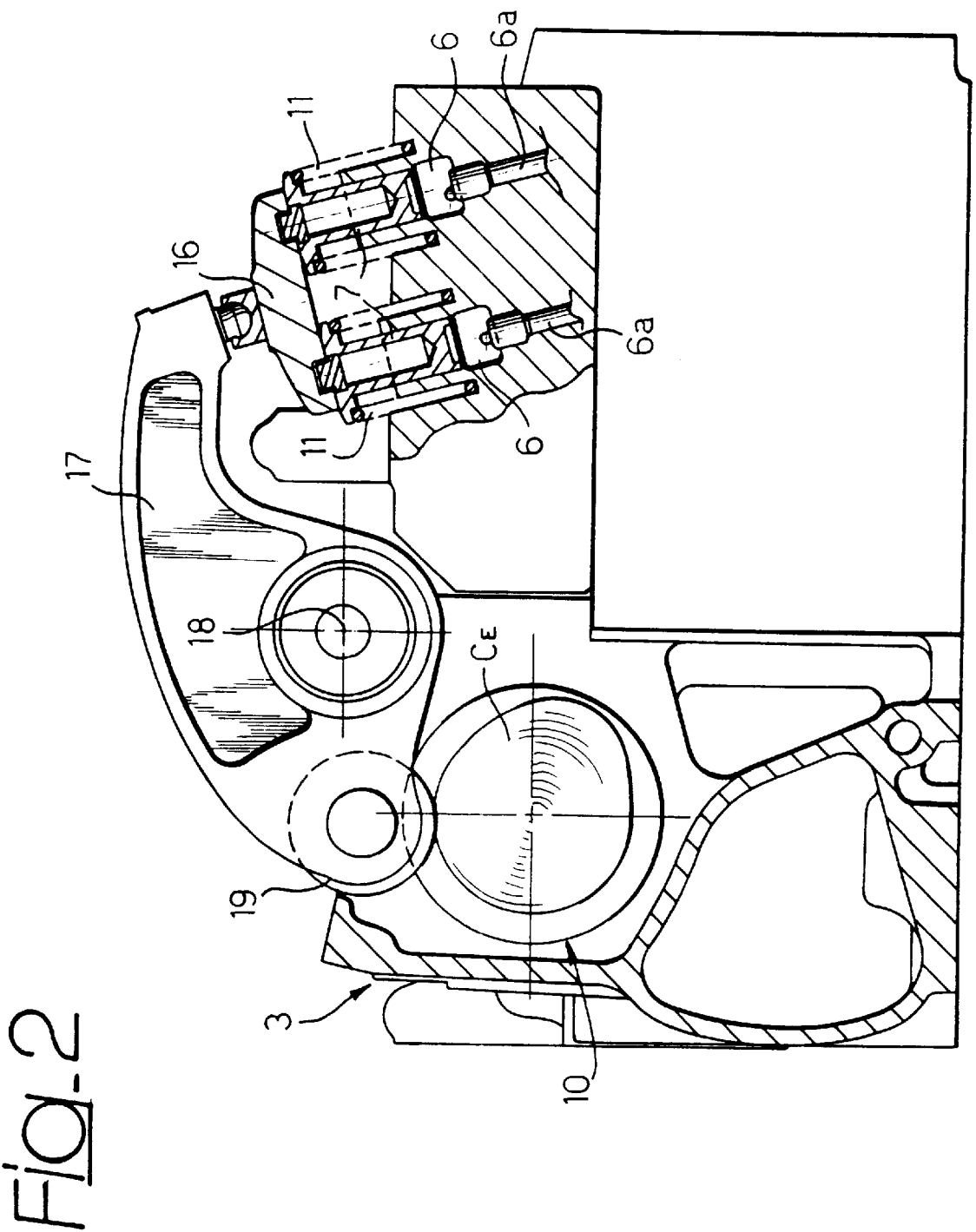
FIGS. 2, 3 are cross-sectional views of a detail of the exhaust valve control in a preferred embodiment of the engine according to the invention.
Figure 3:
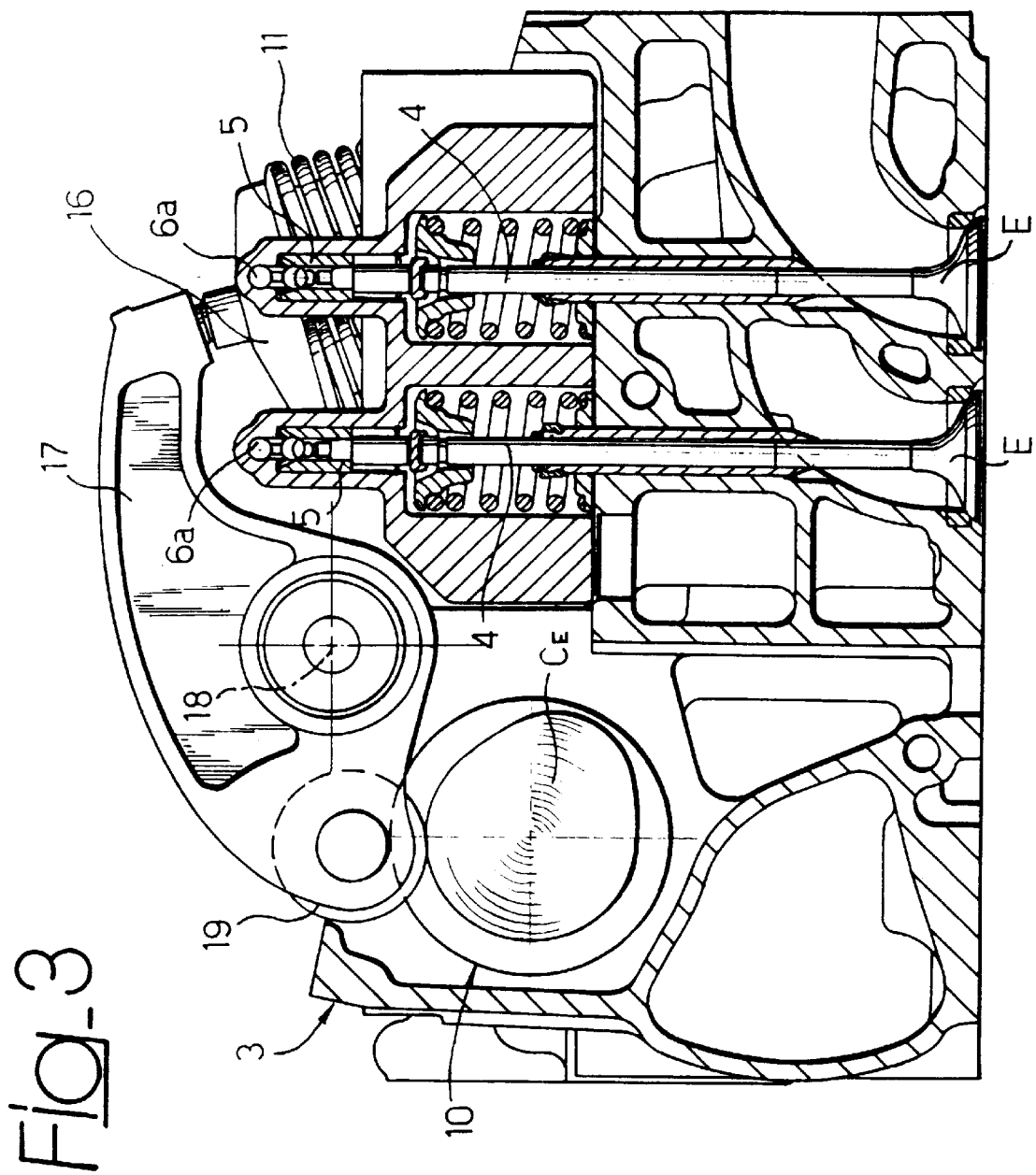

FIGS. 2, 3 show by way of example the detail of the exhaust valve control of a preferred embodiment of the engine according to the invention. In these figures, reference CE designates a cam which controls the opening of two exhaust valves E (FIG. 3) associated with a cylinder of the engine. The two valves E have respective return springs 4 and are controlled at their upper ends by two respective pistons 5 which face two conduits 6a. These conduits open on two pressure chambers 6 towards which two pistons 7 also face, each provided with a respective return spring 11. The two pistons 7 are controlled simultaneously by a bridge-like element 16 which is pivotally mounted to one end of a rocker-arm 17 which is pivotally supported around an axis 18 by the structure of the engine head 3. The other end of the rocker-arm carries a cam-follower roller 19 which is in contact with the cam $C_E$ of the cam shaft 10. As it clearly appears, in the above described arrangement, differently from what has been shown in FIG. 1, the axes of valves E are in a different plane with respect to the axes of the pistons 7. This is possible due to that the movement of pistons 7 is transmitted to the valves hydraulically, by means of the oil under pressure filling chamber 6 and conduits 6a.

Figure 4:
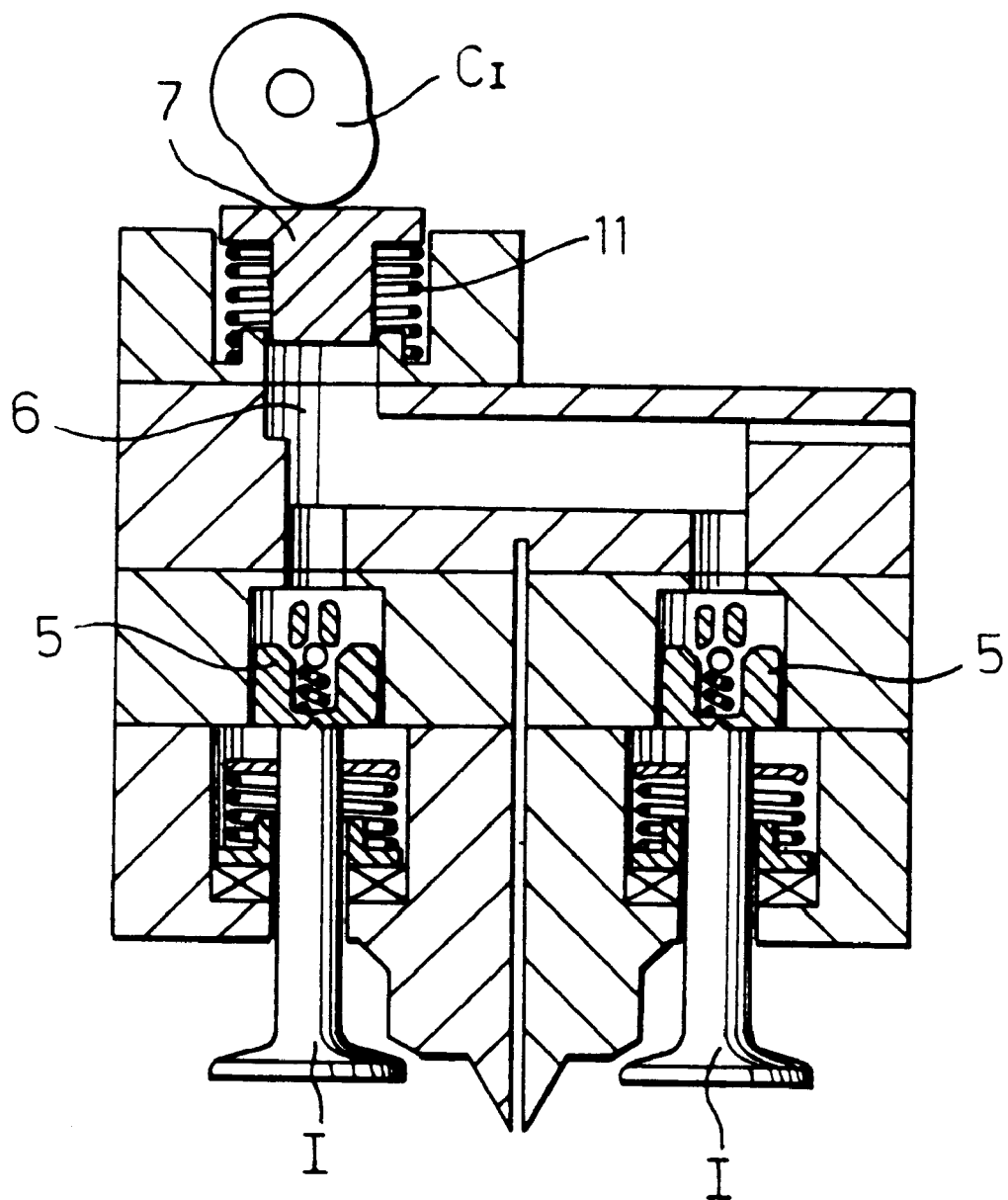
FIG. 4 is a diagrammatic view of the intake valve control in the engine according to the invention.

FIG. 4 diagrammatically shows the arrangement for controlling the intake valves of the engine according to the invention, in which a cam $C_I$ cooperates with a piston 7 provided with a respective spring 11 and facing the pressure chamber 6 which on its turn simultaneously controls the two pistons 5 associated with two intake valves I of each cylinder of the engine.

Figure 5:
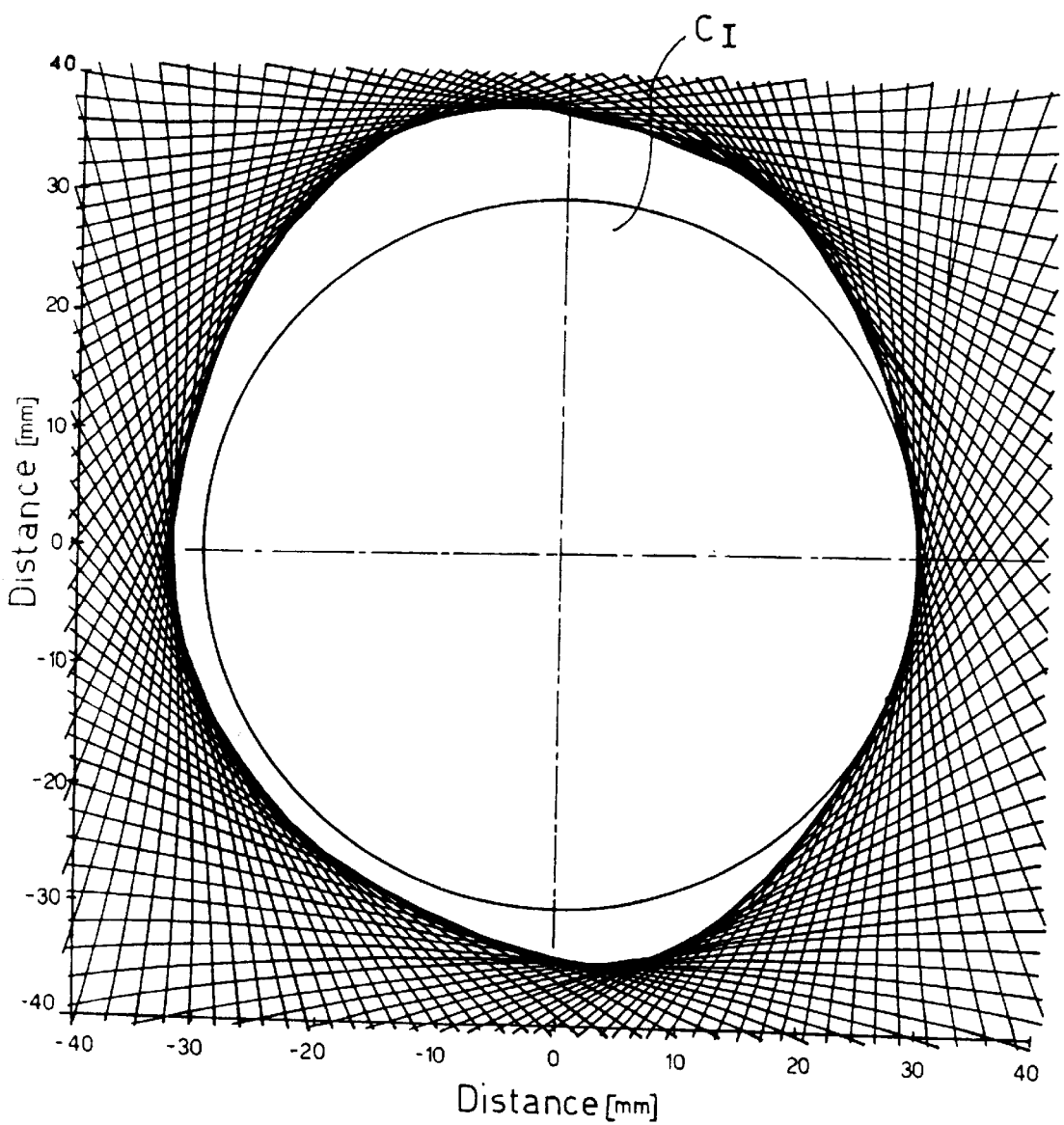
FIGS. 5, 6 are views showing the cams of the embodiment according to the invention, respectively associated with the intake and exhaust valves.
Figure 6:
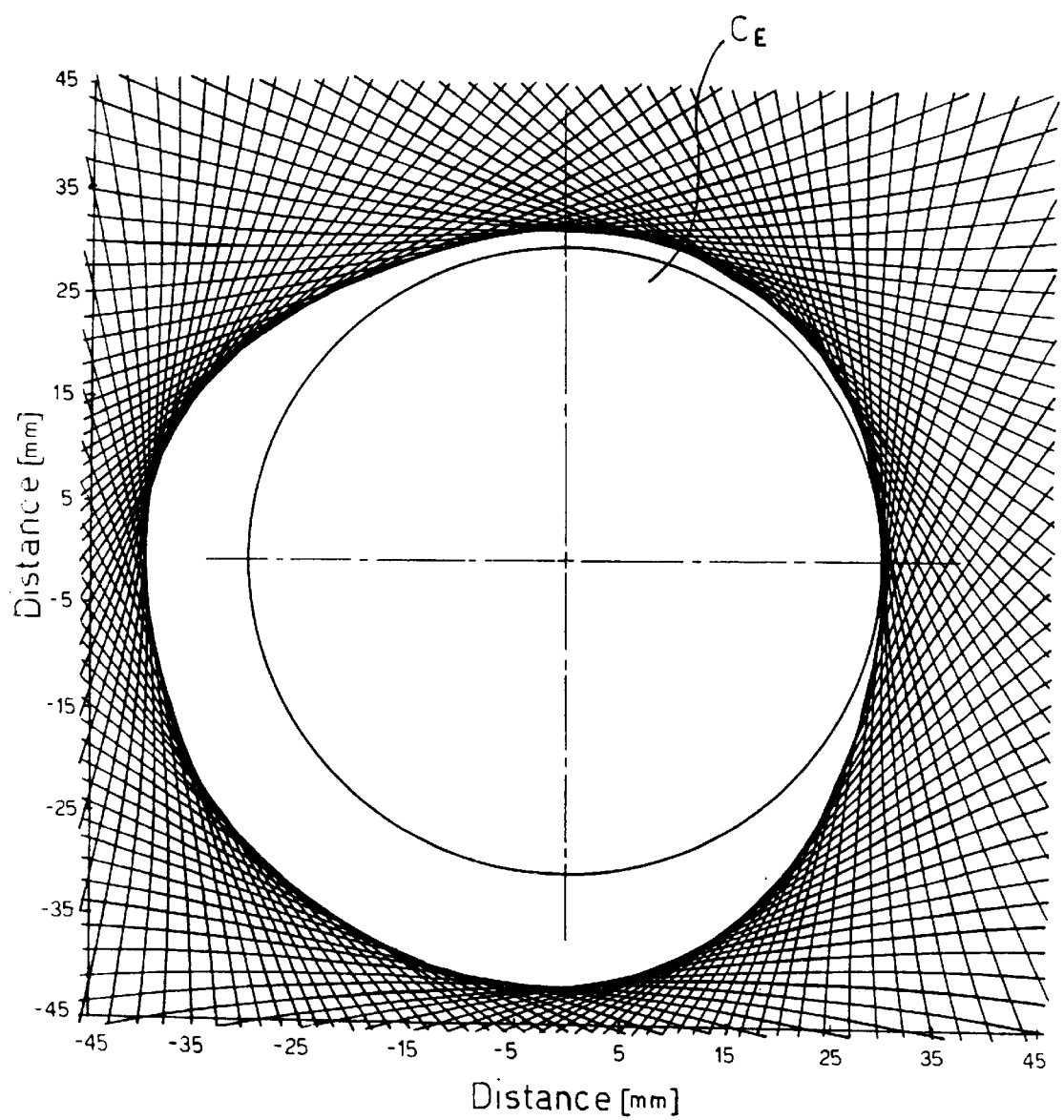

FIGS. 5, 6 show the profile of cam $C_I$ for operating the intake valves and the cam $C_E$ for operating the exhaust valves in a preferred embodiment of the invention. As shown, each of these cams has a complex profile, different from the conventional profile, in order to cause the intake and exhaust valves to open not only in the conventional stages, as provided in a conventional cycle of operation of the engine, but also during additional stages, according to different modes of operation of the engine which can be selected by means of the variable valve actuation system, which can enable or disable at will portions of the profile of the cams.

Figure 7:
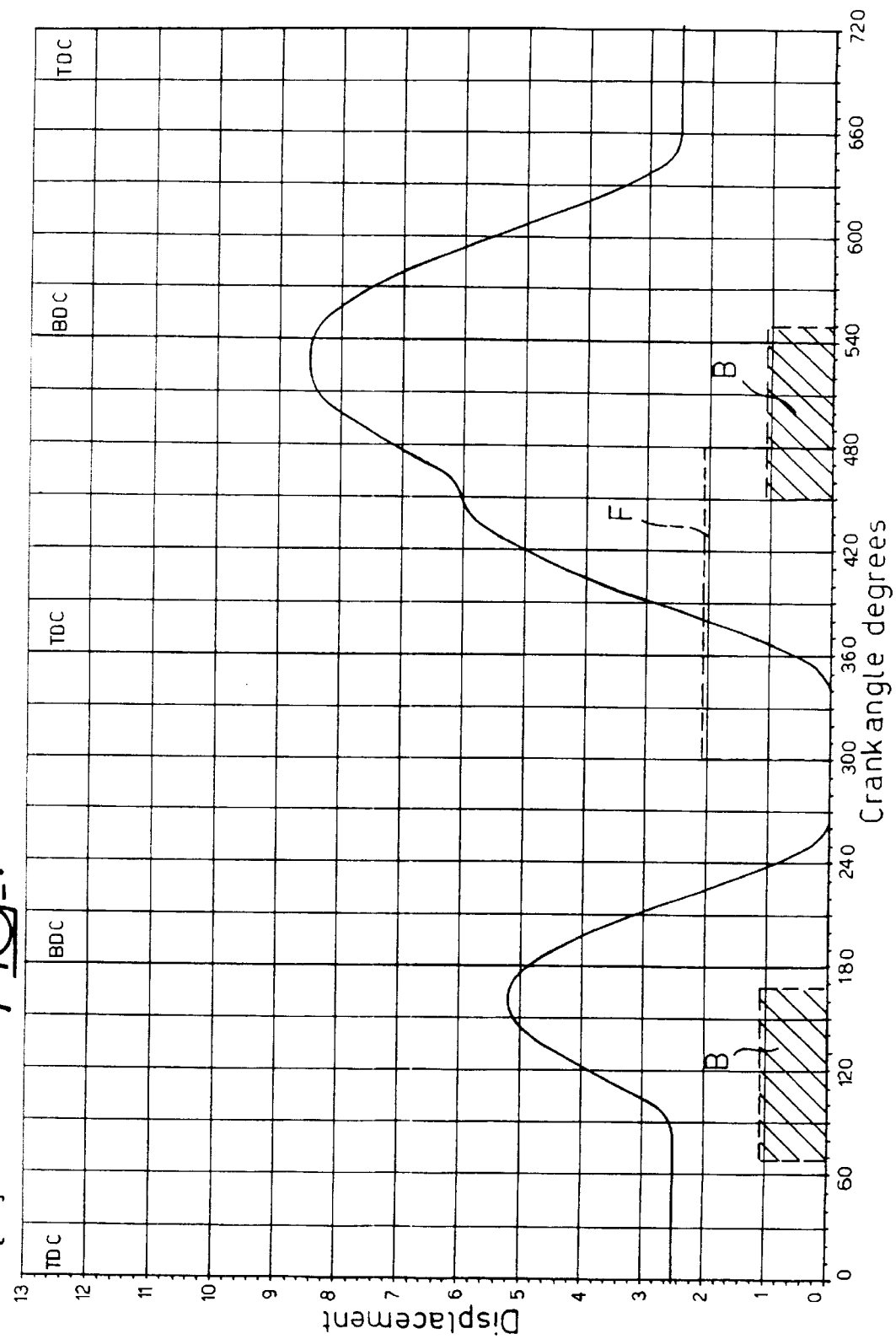
FIG. 7 is a diagram showing the movement of the piston associated with an intake valve control cam.
Figure 8:
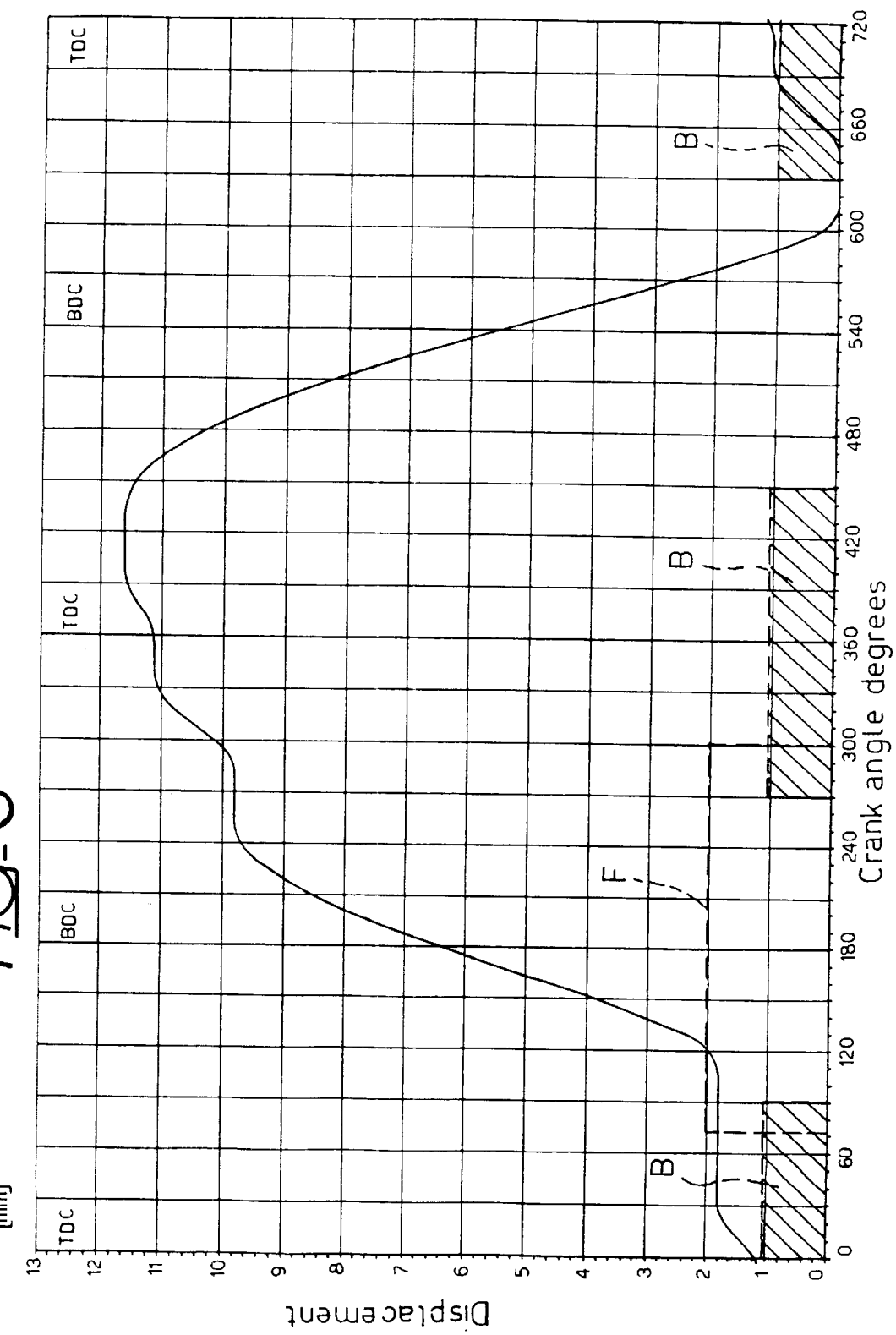
FIG. 8 is a diagram showing the movement of the piston associated with the exhaust valve control cam.

FIGS. 7, 8 are two diagrams which can be considered substantially as a different way of showing the profiles of cams $C_I$ and $C_E$. As a matter of fact, FIG. 7 shows the displacement of piston 7 associated with the intake valves I as a function of the angle of rotation of the engine crankshaft. Since the displacement of piston 7 is directly determined by the profile of the control cam $C_I$, it follows that the diagram of FIG. 7 can be considered as a representation of this profile. In this diagram, by TDC and BDC are indicated the angular positions corresponding to the top dead centre and the bottom dead centre of the piston associated with the engine cylinder under consideration. Similarly, FIG. 8 shows the displacement of piston 7 associated with the exhaust valves E and therefore can be considered as a further representation of the profile of cam $C_E$ actuating the exhaust valves.

In the diagrams of FIGS. 7, 8, F designates the angular ranges of the engine cycle in which, in the regular combustion operation of the engine, the solenoid valves associated with the variable valve actuation system are held closed, so that the intake and exhaust valves I and E are driven by the respective cams $C_I$ and $C_E$. In other words, in the regular combustion operation of the engine, the intake valves I are driven by cams $C_I$ only within the range between 300° and 480°, whereas the exhaust valves "feel" the respective cams $C_E$ only within the range between 70° and 300°, approximately. Therefore, if the engine should operate according to the conventional cycle, it would be sufficient that the cams have the portion of their profile which is active corresponding to the above indicated angular ranges. However, at as it clearly appears from FIGS. 7, 8, the cam profiles of the engine according to the invention are such as to cause additional opening strokes of the valves even outside the above indicated angular ranges, in order to provide different cycles of operation. As already indicated above, it is a task of the electronic control means of the variable valve actuation system to control the respective solenoid valves in order to enable or disable the various portions of the profiles of the cams of the engine so as to selectively obtain said different modes of operation of the engine.

Figure 15:
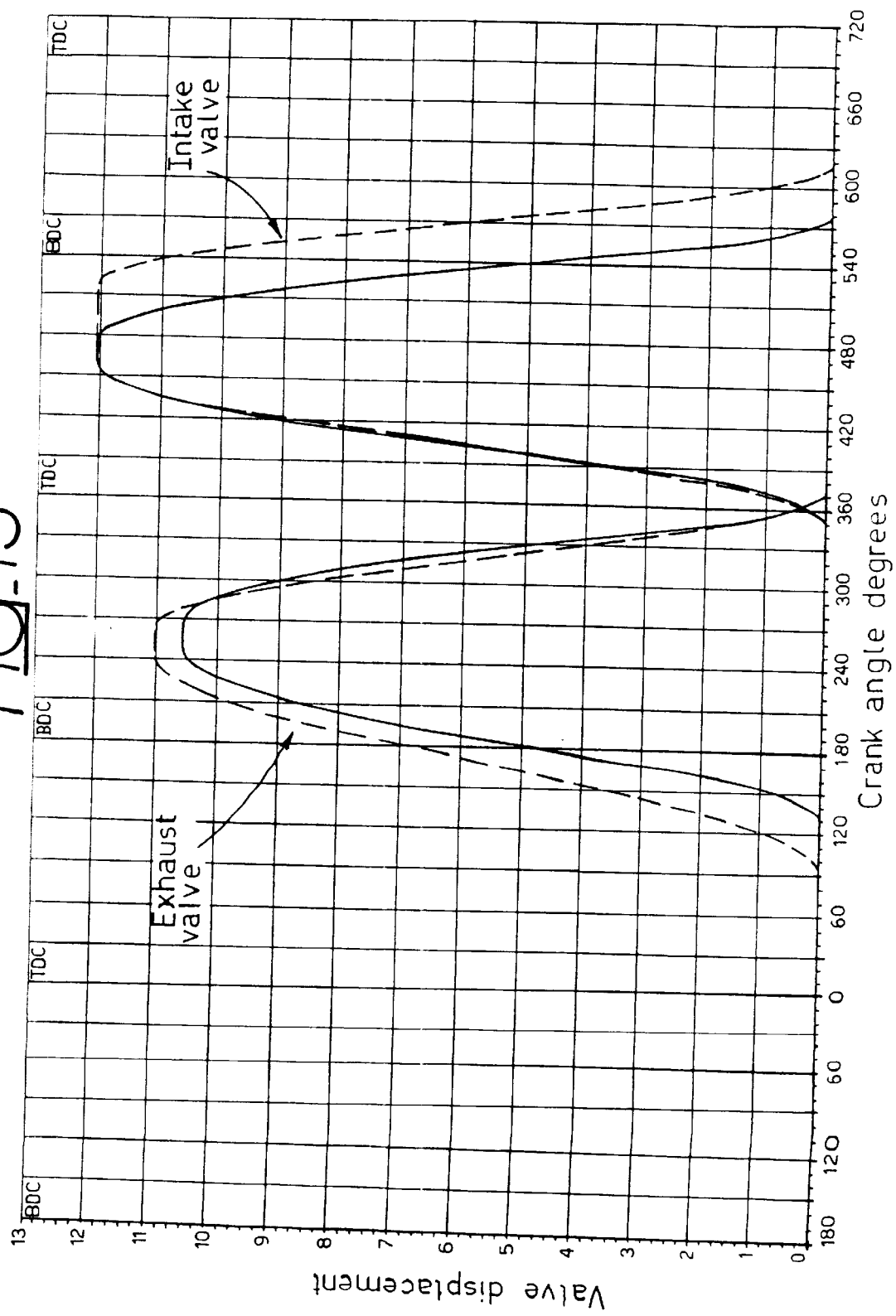
FIG. 15 is a diagram showing by undotted line the opening strokes of the intake and exhaust valves in the regular cycle of operation of the engine, and by dotted line the opening stroke of the intake valve in the mode according to the "Miller" cycle and the opening stroke of the exhaust valve in an anti-turbo lag mode.

In the regular mode of operation of the engine, the opening strokes of the intake and exhaust valves are those visible by undotted line in the diagram of FIG. 15 which shows the displacement of the intake and exhaust valves at the various engine crank angles. In the regular cycle of operation of the engine, angle 0 corresponds to the explosion, with the piston at the top dead centre in the cylinder. Starting from this position, the four staged of expansion, exhaust, intake and compression take place in sequence respectively within the angular ranges 0°–180°, 180°–360°, 360°–540° and 540°–720°. With reference still to FIG. 15, it appears that the intake and exhaust valves are driven so as to open according to the conventional cycle of operation of the engine, substantially during the intake and exhaust stages. This conventional mode of opening the intake and exhaust valves is controlled by the respective cams $C_I$ and $C_E$, within the angular ranges F shown in FIGS. 7, 8, wherein these cams are "enabled" to drive the respective valves by the electronic control means.

Figure 9:
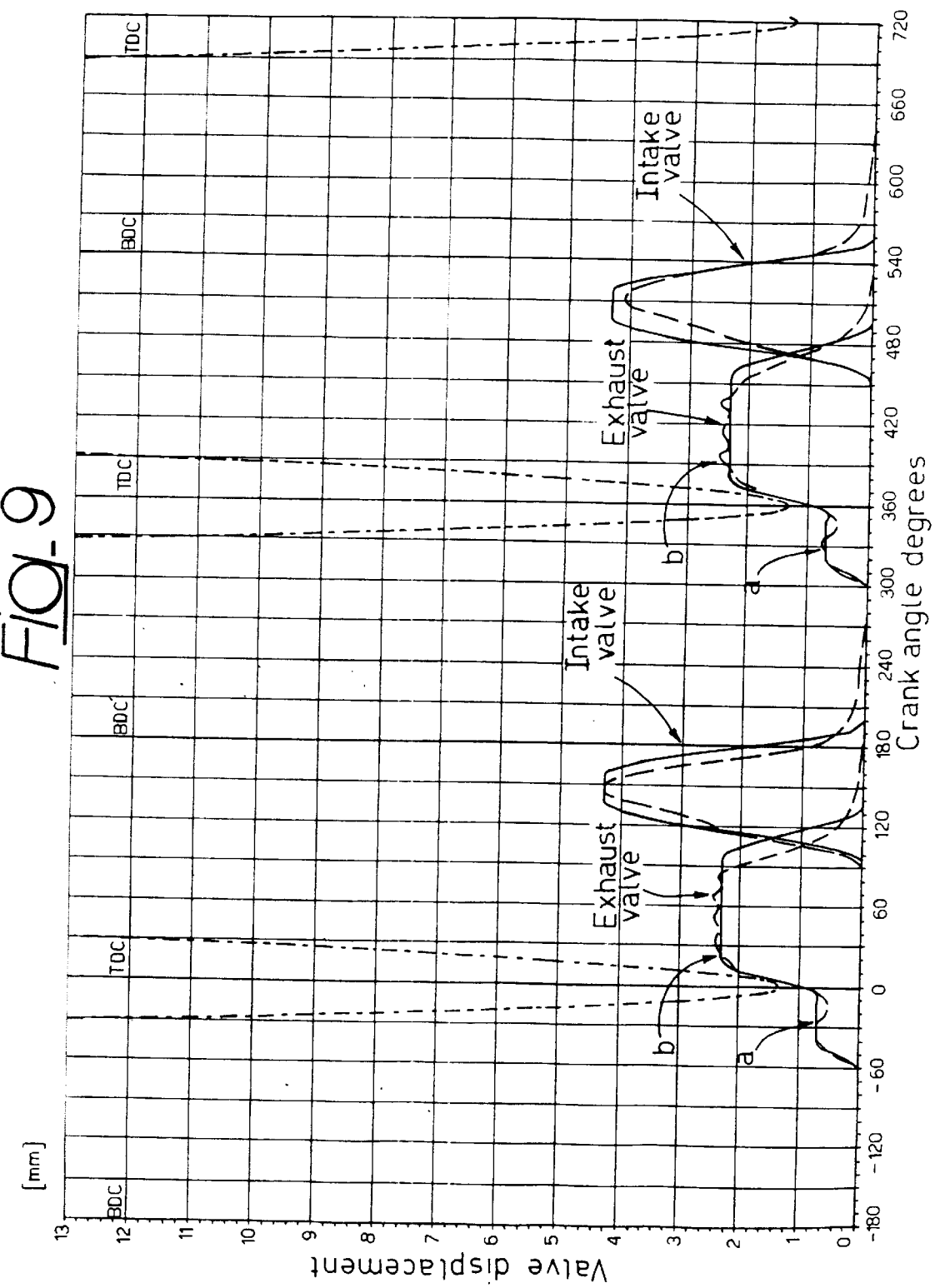
FIG. 9 is a diagram showing the opening strokes of the intake and exhaust valves in the mode of operation of the engine as a brake.

According to the invention, the engine is able to operate in a first mode of operation alternative to the regular mode of operation of the engine, in order to obtain a braking effect. The problem of braking heavy trucks, particularly in condition of protracted braking, such as on long downslopers at full load, is critical. According to the invention, when it is necessary to operate the engine as a brake, the electronic control means attend to controlling the respective solenoid valves so as to hold them closed, thus enabling the respective cams, only within the ranges indicated by B in FIGS. 7, 8. In this way, the intake and exhaust valves do not "feel" the portion of the profile of the cams which normally controls the opening of the valves in the regular cycle of operation of the engine, whereas they feel further portions of this profile, which cause a different mode of operation of the valves, as shown in FIG. 9. This figure shows a diagram similar to that of FIG. 15 which shows how the opening strokes of the intake and exhaust valves are modified in the mode of operation of the engine as a brake. In this mode of operation, substantially during each upstroke of the piston within the cylinder from the bottom dead centre to the top dead centre, the intake and exhaust valves are kept closed, so that the engine during this stage operates as a compressor, thus absorbing power. However, at the end of each piston upstroke, the exhaust valve is opened (portion a in the diagram) so that the maximum pressure within the cylinder has not raise above a given pre-determined value. This is done in order to avoid that during the following downstroke the compressed air returns all the previously absorbed power, so as to provide no braking effect, which would take place if the volume of air within the cylinder remained always the same, so as to behave as a spring. The exhaust valve is held opened also in the first part of each piston downstroke (portion b in the diagram) so that during the piston downstroke some air is taken into the cylinder from the exhaust manifold. Thus, a decrease is obtained of the air flow through the turbine of the turbo-supercharger, which keeps the efficiency of this turbo-supercharger quite high. Indeed, in the braking mode of operation which has been described above, a two-stroke cycle is actually obtained, having an active compression stroke at each piston upstroke towards the top dead centre, and an intake stage with full filling of the cylinder at each piston downstroke. By operating in this way (in the braking mode of operation obviously no fuel is injected into the cylinder) the air flow through the compressor of the turbo-supercharger would be doubled with respect to the air flow which is fed to this compressor during the regular cycle of combustion operation of the engine. This would cause a dramatic reduction of the efficiency of the turbo-supercharger with a resulting insufficient compression of the intake air in the cylinder. By intaking air from the exhaust conduit this drawback is overcome. As shown, furthermore, in the second part of the piston downstroke within the cylinder also the intake valve is opened, so as to fully fill the cylinder with air and to be ready for a subsequent compression stage, with the piston upstroke towards the top dead centre, during which both valves are closed. As already indicated, the above-mentioned braking mode of operation of the engine is easily obtained since the cams of the engine have portions of their profile adapted to control the opening of the valves in the regular mode of operation of the engine as well as in the braking mode of operation, the electronic control means controlling the solenoid valves of the variable valve actuation system so as to enable and disable the above-mentioned profile portions according to the desired mode of operation.

In FIG. 9, for greater precision the theoretical opening strokes of the valves as calculate have been shown by undotte line, whereas the opening strokes which actually take place, due to the presence of the oil between cam and valve, have been shown by dotted lines.

Figure 12:
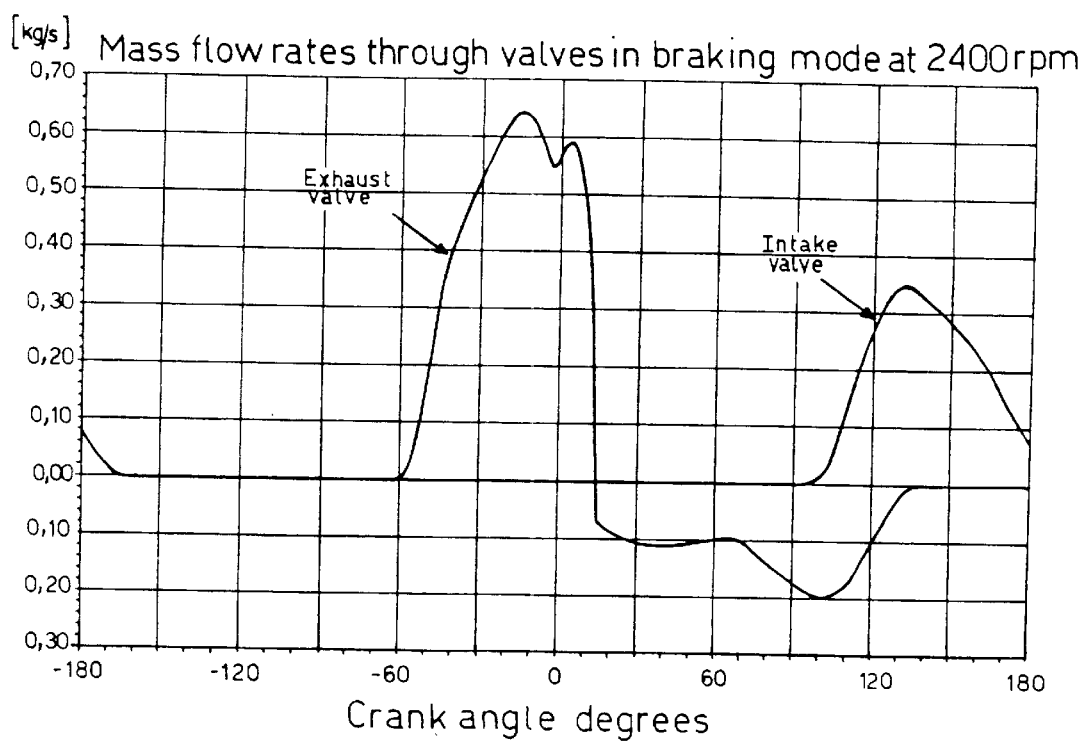

FIGS. 10, 11, 12 show the operation of the engine in the braking mode of operation. FIG. 10 shows the pressure within the cylinder at a speed of 2400 rpm. The maximum pressure within the cylinder is not reached at the top dead centre, but a little before, due to the opening of the exhaust valve during stage a shown in FIG. 9.

FIG. 11 is a diagram showing the pressure within the intake manifold, the exhaust manifold and the cylinder. Finally, FIG. 12 is a diagram showing the mass flow rate through the intake and exhaust valves, again in the braking operation. It is to be noted that in FIG. 9 but . . . -end-dot lines there is shown the displacement of the piston in the cylinder, in order to show the absence of any interference between the piston and the exhaust valve when the latter is opened and the piston is close to the top dead centre.

Figure 13:
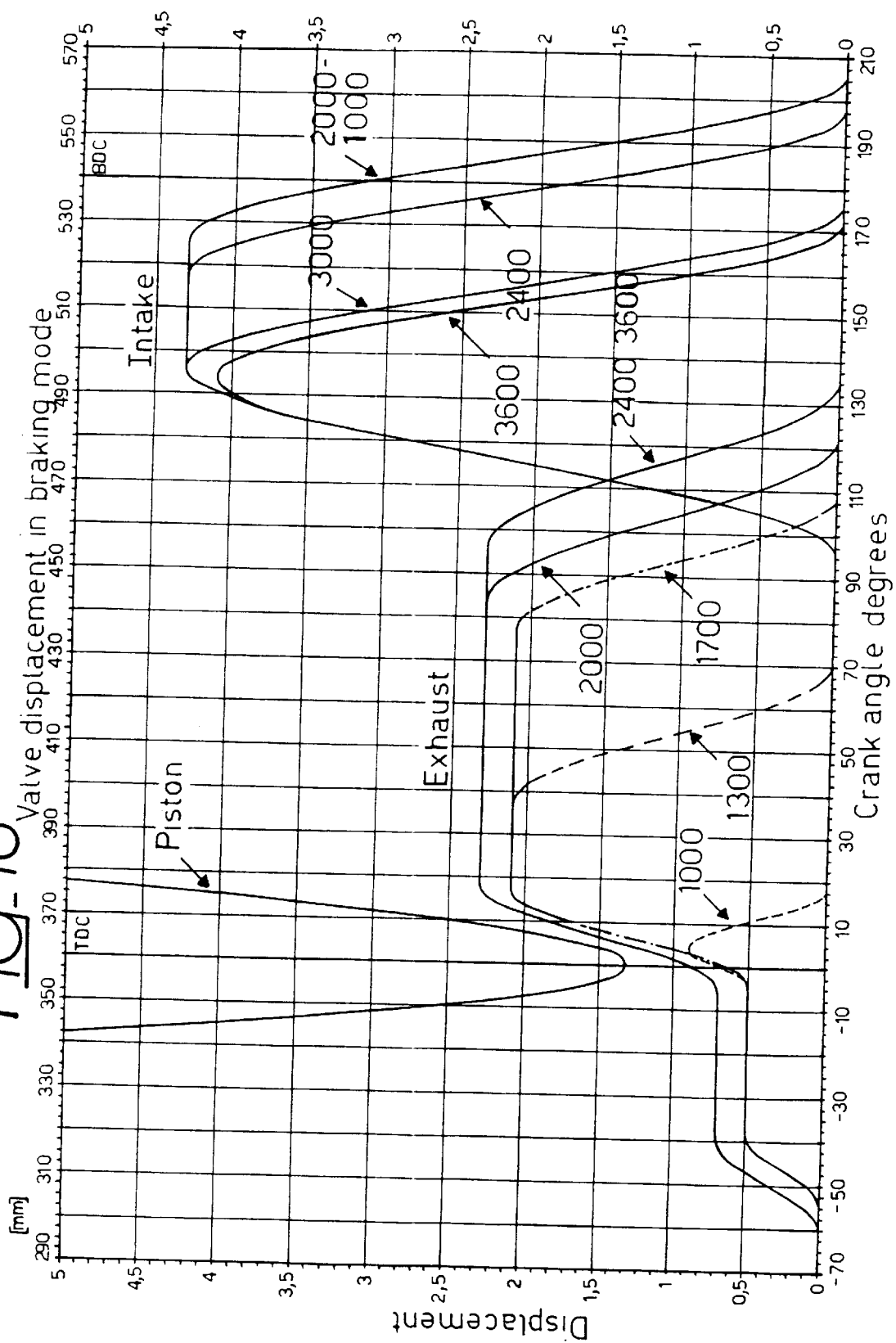

Finally, FIG. 13 is a diagram similar to FIG. 9 which shows that the opening of the intake and exhaust valves in the braking mode of operation can be varied according to the engine speed. The diagram shows indeed the different opening strokes of the valves at the different engine speeds.

Figure 14:
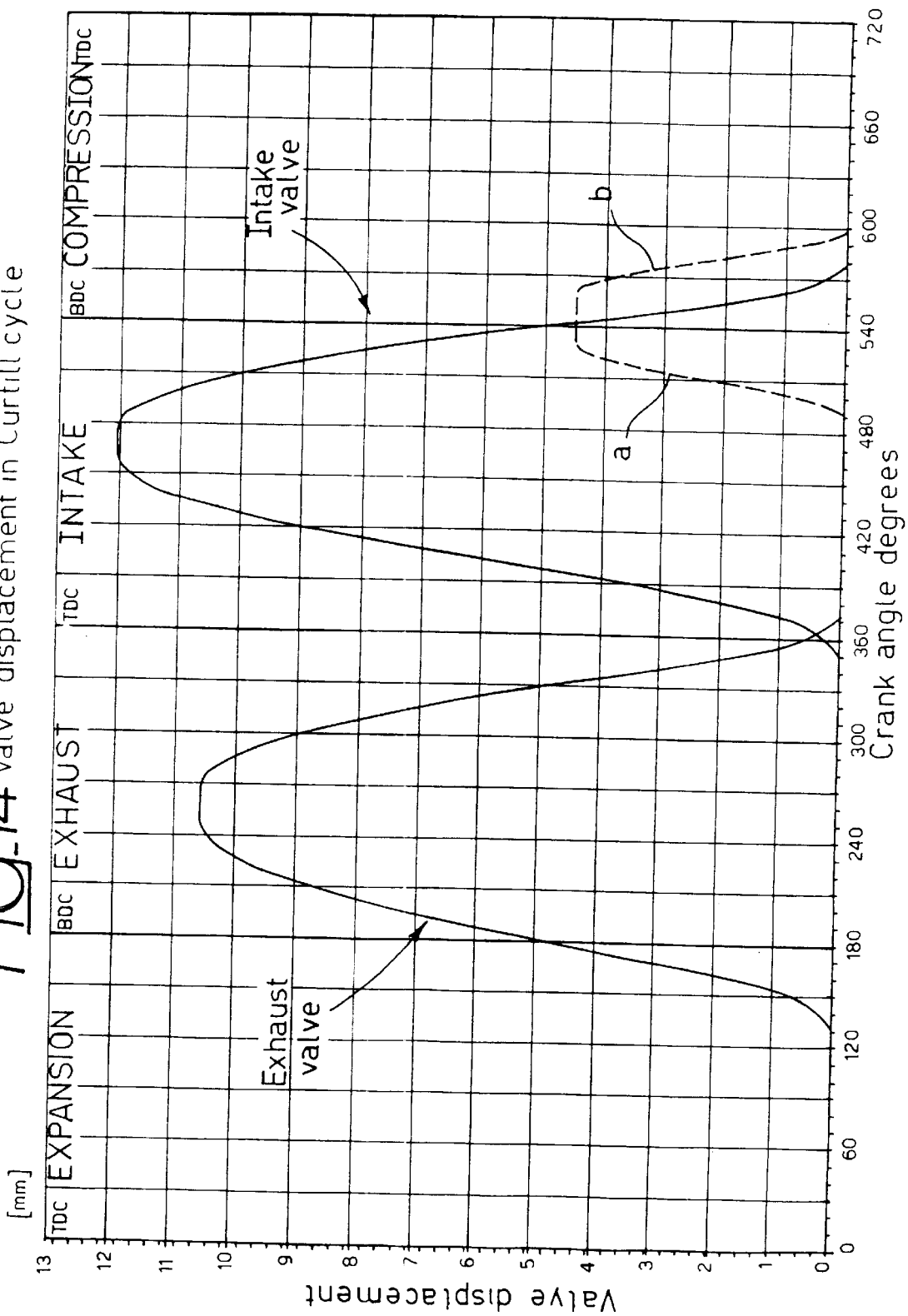
FIG. 14 shows a diagram which shows the opening strokes of the valves in a mode of operation of the engine according to the "Curtill" cycle.

FIG. 14 shows a further mode of operation of the engine in which a cycle of operation of the "Curtill" type is obtained. In this cycle, beyond the regular opening stages of the intake and exhaust valves corresponding to the conventional cycle, an additional opening stage of the exhaust valve is obtained as shown by broken line in this figure. As previously discussed, due to this additional opening of the exhaust valve in the final part of the intake stage and in the first part of the compression stage a better filling of the cylinder is obtained. As a matter of fact, in the first part a of this additional opening of the exhaust valve, some fresh air flows directly from the intake conduit to the exhaust conduit, whereas in the second part b the air introduced into the exhaust conduit returns into the cylinder due to the extra-pressure which has meanwhile established within the exhaust manifold due to the other cylinders which are in the exhaust stage. In the engine according to the invention, the electronic control means can control the respective solenoid valves to provide the above-mentioned additional opening of the exhaust valve, according to the Curtill cycle, only at some engine speeds for which this additional opening is advantageous, whereas it is eliminated at speeds where it is detrimental.

FIG. 15, finally, shows by unbroken lines the opening strokes of the intake and exhaust valves in the regular cycle of operation of the engine, whereas by broken lines there are shown respectively the opening stroke of the intake valve in a further mode of operation which provides the so-called "Miller" cycle, and the opening stroke of the exhaust valve in yet a further mode of operation which is useful for reducing the so-called "turbo-lag" effect, i.e. the inertia of the turbo-supercharger in responding to the demand from the user in transient conditions. In particular, in the first case the closing of the intake valve is anticipated or postponed (in the case shown in FIG. 15 it is postponed) in order to obtain a decrease or an increase of the compression ratio. If for instance the closing of the intake valve is postponed, the compression stage starts when the piston has already raised from the bottom dead centre, so that the compression ratio is decreased. In this manner, the temperature which is reached is decreased and as a consequence the $No_x$ at the exhaust are decreased. Vice versa, by increasing the compression ratio an increase of the compressed air is obtained, which is advantageous in order to favour for instance starting of the engine at cold temperature.

In the case instead of the mode of operation adapted to reducing the "turbo-lag" effect (broken diagram on the left of FIG. 15) the opening of the exhaust valve is anticipated and increased, in order that the exhaust gases have greater enthalpy, so as to decrease the detrimental effects due to the inertia of the turbo-supercharger in the transient conditions.

Therefore, as it is clearly apparent from the foregoing description, the invention proposes a Diesel engine for trucks, particularly of the type supercharged by a turbo-supercharger actuated by the exhaust gases, which is provided with a variable valve actuation system and in which the cams controlling the intake and exhaust valves have a profile such that they are able to control the valves not only during the normal opening stages within the regular cycle of operation of the engine, but also during additional stages of the cycle, so that the electronic control means, which form part of the variable valve actuation system can enable and disable the corresponding portions of the cam profiles, so as to provide a plurality of different modes of operation of the engine which can be selected according to the condition of use of the engine. The electronic control means can be arranged in order to provide the selection of the various modes of operation automatically, according to the operating conditions of the engine or, for instance in the case of the braking mode of operation, upon demand from the user.

A further preferred feature of the invention is represented in particular by the way, which has been described above, by which the braking mode of operation of the engine is provided, which achieves an efficient braking of the motor-vehicle by simple means and to an extent variable with the engine speed.

Naturally, while the principle of the invention remains the same, the details of construction and the embodiments may widely vary with respect to what has been described and illustrated purely by way of example, without departing from the scope of the present invention.

It is clearly apparent, for instance, that the geometry of the cams of the engine according to the invention might also be different from that shown by way of example in the annexed drawings. The same applies of course to the arrangement and the geometry of the device for controlling the hydraulic tappets.

According to the invention, it is essential that the cams are designed in order to provide, in addition to the regular cycle of operation of the engine, at least the braking mode of operation. The provision of cams adapted to provide also further modes of operation as described above is obviously preferred and also the case can not be excluded, obviously, that still further modes of operation different from those described above can be provided.

In short, due to the invention it is possible to obtain a multi-cylinder Diesel engine for trucks, of a type supercharged by turbo-supercharger, which, by simple means, is able to operate according to different modes of operation in response to different possible demands, such as braking of the motor-vehicle, reduction of the noxious emissions, facilitated starting at cold temperature, reduction of the "turbolag" effect, possibility of internal exhaust gas recirculation.

Naturally, the invention is applicable also to an engine which is not supercharged.

What is claimed is:

1. Multi-cylinder diesel engine, comprising:
   at least one intake vale (11) and at least one exhaust valve (E) for each cylinder, each provided with respective return spring means (4) biasing the valve towards the closed position, for controlling respective intake and exhaust conduits,
   a cam shaft (10) for actuating the intake and exhaust valves (I, E) of the engine cylinders by means of respective tappets (7), each intake valve and each exhaust valve being driven by a cam ($C_I$, $C_E$) of said cam shaft (10),
   wherein each of said tappets (7) drives the respective intake or exhaust valve (I, E) against the action of said return spring means (4) through the interposition of hydraulic means including a chamber of fluid under pressure (6),
   the chamber of fluid under pressure (6) associated with each intake valve (I) and each exhaust valve (E) being adapted to be connected through a solenoid valve (15) to an outlet channel (12), in order to uncouple the valve from the respective tappet (7) and to cause the valve to close rapidly under the action of the respective return spring means (4),
   electronic control means for controlling each solenoid valve (15) for varying the opening time and stroke of the respective intake or exhaust vale (I, E) as a function of one or more parameters of operation of the engine,
   wherein each cam of the engine cam shaft (10) has a profile such as to tend to cause the respective intake or exhaust valve (I. E) controlled thereby to open not only during the conventional opening stage within the regular cycle of operation of the engine, but also at some additional stages of the cycle,
   wherein said electronic control means are adapted to cause each solenoid valve (15) to open so as to keep the respective intake or exhaust valve (I, E) closed during the above-mentioned conventional stage and/or during one or more of said additional stages at which the respective cam would tend to cause opening of the valve, so that the engine can be operated selectively according to different modes of operation by controlling said solenoid valves (15), and
   wherein said electronic means are adapted to provide a mode of operation of the engine as a brake, wherein no fuel is injected into the cylinders and wherein each solenoid valve (15) in controlled so as to keep the intake and exhaust valves (I, E) of each cylinder closed substantially during each upstroke of the respective piston from the bottom dead center to the top dead center, so as to exploit the power absorbed at each piston upstroke in order to obtain a braking effect, said electronic means being also adapted to allow each exhaust valve to open, by closing the respective solenoid valve (15) immediately before the piston reaches the top dead center, due to the action of the respective cam ($C_E$).

2. Engine according to claim 1, wherein said engine is supercharged by a turbo-supercharger actuated by the exhaust gases, wherein in said braking mode of operation of the engine, the exhaust valve (E) is held opened during a first part of the piston downstroke from the top dead center, so as to take air into the cylinder from the exhaust conduit, in order to decrease the air flow fed to the turbo-supercharger.

3. Engine according to claim 2, wherein in said braking mode of operation, the intake valve is held opened in the final part of the piston downstroke towards the bottom dead center.

4. Multi-cylinder diesel engine, comprising:
- at least one intake vale (11) and at least one exhaust valve (E) for each cylinder, each provided with respective return spring means (4) biasing the valve towards the closed position, for controlling respective intake and exhaust conduits,
- a cam shaft (10) for actuating the intake and exhaust valves (I, E) of the engine cylinders by means of respective tappets (7), each intake valve and each exhaust valve being driven by a cam ($C_I$, $C_E$) of said cam shaft (10),
- wherein each of said tappets (7) drives the respective intake or exhaust valve (I, E) against the action of said return spring means (4) through the interposition of hydraulic means including a chamber of fluid under pressure (6),
- the chamber of fluid under pressure (6) associated with each intake valve (I) and each exhaust valve (E) being adapted to be connected through a solenoid valve (15) to an outlet channel (12), in order to uncouple the valve from the respective tappet (7) and to cause the valve to close rapidly under the action of the respective return spring means (4),
- electronic control means for controlling each solenoid valve (15) for varying the opening time and stroke of the respective intake or exhaust vale (I, E) as a function of one or more parameters of operation of the engine,
- wherein each cam of the engine cam shaft (10) has a profile such as to tend to cause the respective intake or exhaust valve (I. E) controlled thereby to open not only during the conventional opening stage within the regular cycle of operation of the engine, but also at some additional stages of the cycle,
- wherein said electronic control means are adapted to cause each solenoid valve (15) to open so as to keep the respective intake or exhaust valve (I, E) closed during the above-mentioned conventional stage and/or during one or more of said additional stages at which the respective cam would tend to cause opening of the valve, so that the engine can be operated selectively according to different modes of operation by controlling said solenoid valves (15), and
- wherein the profile of the cam ($C_E$) controlling each exhaust valve (E) is such that it causes an additional opening stage of the exhaust valve (E) substantially during the final part of the intake stage, so as to provide a Curtill-type cycle of operation, said electronic means being adapted to disable said cam, so as to eliminate said additional opening of the exhaust valve (E) at determined operation speeds of the engine.

5. Multi-cylinder diesel engine, comprising:
- at least one intake vale (11) and at least one exhaust valve (E) for each cylinder, each provided with respective return spring means (4) biasing the valve towards the closed position, for controlling respective intake and exhaust conduits,
- a cam shaft (10) for actuating the intake and exhaust valves (I, E) of the engine cylinders by means of respective tappets (7), each intake valve and each exhaust valve being driven by a cam ($C_I$, $C_E$) of said cam shaft (10),
- wherein each of said tappets (7) drives the respective intake or exhaust valve (I, E) against the action of said return spring means (4) through the interposition of hydraulic means including a chamber of fluid under pressure (6),
- the chamber of fluid under pressure (6) associated with each intake valve (I) and each exhaust valve (E) being adapted to be connected through a solenoid valve (15) to an outlet channel (12), in order to uncouple the valve from the respective tappet (7) and to cause the valve to close rapidly under the action of the respective return spring means (4),
- electronic control means for controlling each solenoid valve (15) for varying the opening time and stroke of the respective intake or exhaust vale (I, E) as a function of one or more parameters of operation of the engine,
- wherein each cam of the engine cam shaft (10) has a profile such as to tend to cause the respective intake or exhaust valve (I. E) controlled thereby to open not only during the conventional opening stage within the regular cycle of operation of the engine, but also at some additional stages of the cycle,
- wherein said electronic control means are adapted to cause each solenoid valve (15) to open so as to keep the respective intake or exhaust valve (I, E) closed during the above-mentioned conventional stage and/or during one or more of said additional stages at which the respective cam would tend to cause opening of the valve, so that the engine can be operated selectively according to different modes of operation by controlling said solenoid valves (15), and
- wherein said electronic control means are adapted to anticipate the opening timing of the exhaust valve with respect to the regular cycle of operation of the engine, in order to reduce the "turbo-lag" effect.

* * * * *